Oct. 7, 1969  N. SCHOFFER  3,470,870

RELAXATION INDUCING APPARATUS

Filed July 28, 1965

INVENTOR.
NICOLAS SCHOFFER

BY

AGENT ns patent office
3,470,870
Patented Oct. 7, 1969

3,470,870
RELAXATION INDUCING APPARATUS
Nicolas Schoffer, 15 Rue Hegesippe Moreau,
Paris 18, France
Filed July 28, 1965, Ser. No. 475,534
Int. Cl. A61h 1/00, 23/00; F21p 3/00
U.S. Cl. 128—1    3 Claims

ABSTRACT OF THE DISCLOSURE

An apparatus which when viewed induces an individual to relax. An image defined by a light emanating from a source is passed through a rotatable multi-colored disc, then reflected by a series of rotatable reflectors, and finally passed through a moving shutter, to be projected on a screen. The rate of rotation of the disc and the rate of movement of the shutter produce an image on the screen which pulsates at a rate corresponding to the respiratory rhythm of the individual thus producing a relaxing effect.

---

The present invention relates to an apparatus capable of producing a relaxation effect on a human being under the action of visual/or audio-visual phenomena.

This kind of apparatus is generally known in the prior art. For instance U.S. Patent 2,425,538 discloses the use of an illuminated eye which winks at the observer in a repetitious manner thereby inducing sleep through its regularity. With such an apparatus the observer adjusts his respiration in a more or less conscious manner on the rhythm of the winking of the luminous eye. However such or like devices are monotonous and deprived of any aesthetic attraction; moreover they require from the spectator a certain amount of effort to concentrate and to adapt his respiratory rhythm to the visual excitation rate.

Other similar devices are also known, for instance the one disclosed in my co-pending U.S. application Ser. No. 263,325, filed Mar. 6, 1963 now U.S. Patent No. 3,242,330. Those devices are capable of producing by retroreflection on a transparent front screen composite images having shape, color, speed, intensity varying to such point and in a very diverse manner that it is practically impossible to trace in said images a periodic recurrence at the same time these images provide some aesthetic pleasure.

An object of the invention is to provide an improved apparatus of the kind first mentioned which imparts superior relaxation effects to the spectator thus inducing sleep.

Still another object of invention is to provide a compact apparatus of the kind first mentioned which is significantly more economical to construct than those previously known. The invention will be described in greater detail with reference to a preferred embodiment thereof illustrated in the accompanying drawing, in which.

Figure 1:
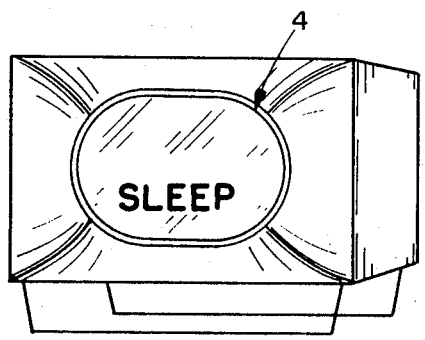
FIGURE 1 shows the perspective view of the apparatus according to the invention.

The apparatus mentioned has the general appearance of a box provided at its front part with a transparent screen on which variable images to be viewed by the spectator are projected. According to the invention these images are more or less masked by a translating slide or preferably a roll-shutter that moves for instance in one direction and then in the reverse direction. The shutter is arranged so as to illustrate a plurality of transverse zones having a variable opacity and are positioned in a periodically repetitive pattern so that when the shutter is moving the sequences of images appear on the screen periodically.

The outside appearance of the apparatus is rather similar to that of a television set. Within the apparatus are the main parts of the mechanism the construction of which has been previously described in U.S. application Ser. No. 263,325 now U.S. Patent No. 3,242,330, i.e. a light source 1 (electric bulb), a transparent disk 2 with colored sectors, a revolving irregular mirror or so called retroreflector 3 which casts back the light from the source 1, which is transmitted through the disk 2, onto the screen 4 after passing through a revolving light mixer 5. The light mixer is an elongated light-reflecting member. Preferably the transparent screen has a circular or elliptical and prominent shape, so as to give to the projected image a specific relief which increases its psychological effect. The spectator then sits or lies in front of the screen of the apparatus and tries to be in the best conditions to obtain the relaxation desired, at about the distance he would choose for watching television.

Figure 2:
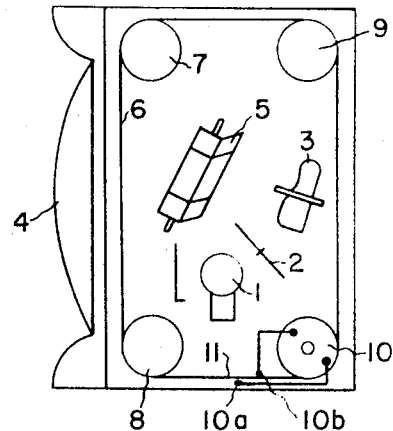
FIGURE 2 shows a longitudinal cross-section of the apparatus of FIG. 1.
Figure 4:
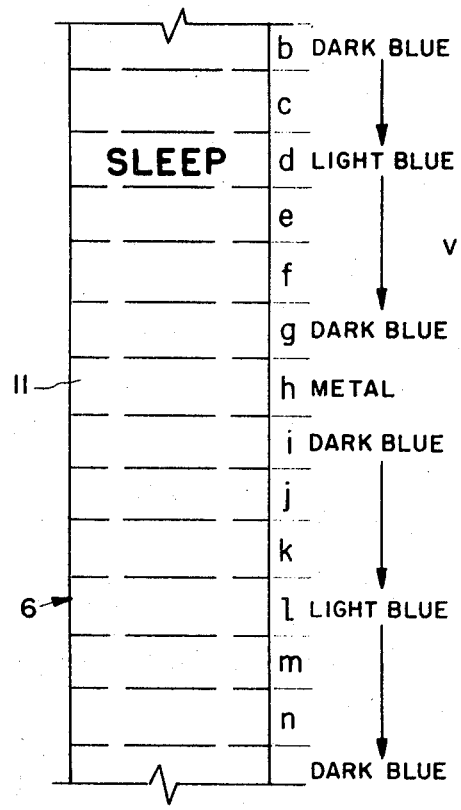
FIGURE 4 illustrates the roll-shutter used in the apparatus.
Figure 3:
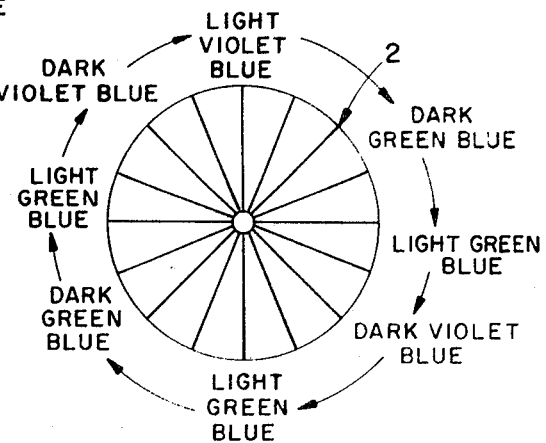
FIGURE 3 illustrates the colored disk used in the apparatus.

According to the invention this apparatus is provided with a shutter 6 which is placed for example between the screen 4 and the "cell" 1–2–3–5 and which has the form of an elongated band whose width is sufficient for covering the entire screen 4 and which runs around drums 7–8. For example, the shutter 6 as illustrated in FIG. 2 is an endless band traversing a path around drums 7–10, wherein drum 10 is driven by a motor. Motor 10 is a synchronous motor capable of rotating in either direction and is controlled by a metallized contact band 11, carried by shutter 6 which passes between brushes 10a or 10b, in combination with a system of holding relays or marginal contact bands existing on the shutter (not shown). The band may be normally a thin substantially transparent material such as cellulose or paper. However, the material must be capable of being colored, for instance by paint or impregnation to provide a variation of predetermined opacities. Opacity may vary from totally transparent to opaque. For that purpose and as represented in FIGURE 4 there are provided on shutter 6 a series of successive transverse zones b, c, d, e, etc. which shade off and are reinforced in their turn when they pass between the screen and the retroreflector. The speed of motor 10 is adjusted to be low enough, preferably so as to attain a translation speed for the shutter of the order of 1 meter per minute and the length of the shutter is sufficient to allow continuous movement of the shutter in one direction during 5 minutes for instance. There is thus obtained a pulsation of the average luminance of the image according to a pre-established rhythm; it is apposite to remark that its periodicity is preferably variable, that is to say that the repetition rate of the average luminance of the image increases during the displacement of the shutter. It may be desirable to design the shutter such that the borders of the transverse zones are not distinctly defined; thus the passage from one zone to the adjacent one be carried out through some progressive gradation.

The basic color of the shutter is preferably a transparent night-blue with variations which shades off by successive, more or less well blended bands towards light blue. Moreover the "cell" 1–2–3–5 also possesses the basic color made also of blue and its variations. To this end disk 2 comprises successive colored sectors presenting hues going from light violet blue to dark green blue and from light green blue to dark violet-blue. Said disk revolves preferably at ½ r.p.m. As the colored rhythms of the disk and shutter are different, their mutual interference gives forth a rhythmic pulsation which depends both from the disposition of the colored sectors of the disk and the disposition of the transverse zones of the shutter.

In the transversal zones of the shutter it is also advantageous to provide successive inscriptions at suitable distances from each other, for instance "feel well," "better now," "much better," "sleepy," "sleep," "sleep," "sleep," "O.K." or any other suitable text. Said inscriptions may be accompanied by an emission of sound, speech or music.

The rhythm of the average light intensity produced by the horizontal bands, in the beginning in correspondence with the translation speed of the shutter, follows the respiration rhythm of a human being awake.

If the five first minutes of this "program" have not resulted in the desired effect, the shutter may be moved in the reverse direction (and eventually at a different speed) for starting again in the first direction.

There is also provided a preferably adjustable time mechanism or automatic switch so that after a few trials the spectator will find for himself the preferred adjustment for inducing sleep.

The above cited embodiments are intended as exemplary only, and while I have described my invention with a specific application and embodiment thereof, other modifications will be apparent to those skilled in the art without departing from the spirit and scope of the invention as defined by the appended claims.

What I claim is:

1. A relaxation inducing machine comprising a light source, a transparent disk having a plurality of sectors thereon adjacent said light source for transmitting light emanating from said light source, a rotatable mirror having an irregular surface disposed adjacent said transparent disk for receiving light transmitted therethrough, a rotatable light mixer adjacent said mirror for receiving light reflected from said mirror, a screen for projecting an image defined by the light reflected from said light mixer, and a shutter means movably interposed between said screen and said light mixer for varying the light intensity transmitted to said screen, wherein said shutter means comprises a band of material divided into a plurality of transverse zones of varying opacity.

2. A relaxation inducing machine according to claim 1 further comprising means for revolving said transparent disk and moving said shutter zones before said screen at a periodic rate substantially equivalent to the respiration of a human being.

3. A relaxation inducing machine according to claim 2 wherein said transverse zones are colored.

References Cited

UNITED STATES PATENTS

| | | | |
|---|---|---|---|
| 1,406,663 | 2/1922 | Lovstrom | 240—3.1 |
| 3,080,474 | 3/1963 | Allen | 240—10.1 |
| 1,445,977 | 2/1923 | Shephard | 40—132.3 |
| 2,791,998 | 5/1957 | Decker | 128—1.03 |
| 3,014,477 | 12/1961 | Carlin | 128—1.03 |
| 3,219,028 | 11/1965 | Giordano | 128—1.03 |

RICHARD A. GAUDET, Primary Examiner

M. F. MAJESTIC, Assistant Examiner

PO-1050
(5/69)

UNITED STATES PATENT OFFICE
CERTIFICATE OF CORRECTION

Patent No. 3,470,870           Dated  October 7, 1969

Inventor(x) NICOLAS SCHOFFER

It is certified that error appears in the above-identified patent and that said Letters Patent are hereby corrected as shown below:

Column 1, in the heading, after the inventor's name and residence insert --Assignor to U.S. Philips Corporation, New York, N.Y., a corporation of Delaware ---

SIGNED AND
SEALED
MAR 3 - 1970

(SEAL)
Attest:

Edward M. Fletcher, Jr.
Attesting Officer

WILLIAM E. SCHUYLER,
Commissioner of Paten